US008759460B2

(12) United States Patent
Ciaccia et al.

(10) Patent No.: US 8,759,460 B2
(45) Date of Patent: Jun. 24, 2014

(54) PROCESS FOR THE POLYMERIZATION OF ETHYLENE, AND ETHYLENE POLYMERS HAVING BROAD MOLECULAR WEIGHT DISTRIBUTION AND LONG-CHAIN BRANCHING

(75) Inventors: Eleonora Ciaccia, Ferrara (IT); Iakovos Vittorias, Mainz (DE); Shahram Mihan, Bad Soden (DE); Lenka Lukesova, Frankfurt (DE); Dieter Lilge, Limburgerhof (DE); Maclovio Herrera Salinas, Frankfurt (DE); Gerhardus Meier, Frankfurt (DE); Gerd Mannebach, Münstermaifeld (DE)

(73) Assignee: Basell Polyolefine GmbH, Wesseling (DE)

( * ) Notice: Subject to any disclaimer, the term of this patent is extended or adjusted under 35 U.S.C. 154(b) by 227 days.

(21) Appl. No.: 13/130,221

(22) PCT Filed: Nov. 30, 2009

(86) PCT No.: PCT/EP2009/008513
§ 371 (c)(1),
(2), (4) Date: Jun. 29, 2011

(87) PCT Pub. No.: WO2010/063432
PCT Pub. Date: Jun. 10, 2010

(65) Prior Publication Data
US 2011/0251360 A1    Oct. 13, 2011

(30) Foreign Application Priority Data
Dec. 1, 2008  (EP) .................................. 08020828

(51) Int. Cl.
| C08F 10/02 | (2006.01) |
| C08F 10/04 | (2006.01) |
| C08F 10/06 | (2006.01) |
| C08F 10/08 | (2006.01) |
| C08F 10/14 | (2006.01) |
| C08F 110/02 | (2006.01) |
| C08F 210/16 | (2006.01) |
| C08F 4/70 | (2006.01) |
| C08F 4/80 | (2006.01) |

(52) U.S. Cl.
USPC ..... 526/115; 526/117; 526/348.2; 526/348.3; 526/348.4; 526/348.5; 526/348.6; 526/352; 526/124.3; 525/240

(58) Field of Classification Search
USPC ............... 526/115, 117, 348.2, 348.3, 348.4, 526/348.5, 348.6, 352
See application file for complete search history.

(56) References Cited

U.S. PATENT DOCUMENTS

| 4,404,344 A * | 9/1983 | Sinn et al. ...................... 526/160 |
| 4,542,199 A * | 9/1985 | Kaminsky et al. ............ 526/160 |
| 2011/0098422 A1* | 4/2011 | Li et al. .......................... 526/107 |

FOREIGN PATENT DOCUMENTS

| WO | WO-95/11264 | 4/1995 |
| WO | WO-9600243 | 1/1996 |
| WO | WO-9704015 | 7/1996 |
| WO | WO-9827124 | 6/1998 |
| WO | WO-9840419 | 9/1998 |
| WO | WO-9912981 | 3/1999 |
| WO | WO-9946302 | 9/1999 |
| WO | WO-0005277 | 2/2000 |
| WO | WO-0024787 | 5/2000 |
| WO | WO-0031090 | 6/2000 |
| WO | WO-2007111499 | 10/2007 |
| WO | WO-2008118866 | 10/2007 |
| WO | WO-2008125208 | 10/2008 |

OTHER PUBLICATIONS

Wikipedia article Ziegler-Natta catalyst; https://en.wikipedia.org/wiki/Ziegler%E2%80%93Natta_catalyst; Feb. 2013.*
Zimm, Bruno H. et al., "The Dimensions of Chain Molecules Containing Branches and Rings", The Journal of Chemical Physics, vol. 17, No. 12 Dec. 1949 , 1301-13014.
Scott, Jennifer et al., "Metal versus Ligand Alkylation in the Reactivity of the (Bis-iminopyridinato)Fe Catalyst", J. Am. Chem. Soc. 2006, 127 2005 , 13019-13029.
Small, Brooke L. et al., "Highly Active Iron and Cobalt Catalysts for the Polymerization of Ethylene", J.Am. Chem. Soc. 1998 , 4049-4050.
Britovsek, George J. , "Novel olefin polymerization catalysts based on iron and cobalt", Chem. Commun. 1998 , 849-850.
Hungenberg, K. D. et al., "Gas Phase Polymerization of [alpha]-Olefins with Ziegler-Natta and Metallocene Catalysts: a Comparison", Fink/Mulhaupt/Brintzinger (Eds.), Zielger Catalysts, Springer-Verlag Berlin Heidelberg BASF AG, Plastics Laboratory, D-67056 Ludwigshafen; 1995 , 363-386.
Strauss, Steven H. , "The Search for Larger and More Weakly Coordinating Anions", Chem. Rev. vol. 93(3) 1993 , 927-942.
Graessley, William W. , "Effect of Long Branches on the Flow Properties of Polymers", Accounts of Chemical Research, vol. 10 1977, 332-339.
Benoit, H. Rempp et al., "A Universal Calibration for Gel Permeation Chromatography", Journal of Polymer Sci., Phys. Ed. 5 1967, 753-759.

* cited by examiner

*Primary Examiner* — Roberto Rabago

(57) ABSTRACT

New ethylene polymers having broad molecular weight distribution and long-chain branching, above all at high molecular weight fractions; the polymers have strain hardening equal or higher than 1.4 (at constant elongational rate of $0.5$ s$^{-1}$, at 150° C.), branching index g' equal or lower than 0.9 (at Mw of $2 \cdot 10^6$ g/mol). The polymers are prepared by using a mixed catalyst system comprising a polymerization catalyst based on a late transition metal component having a tridentate ligand, and a Ziegler polymerization catalyst annealed at a temperature higher than 100° C., for a time of at least 10 minutes.

23 Claims, 2 Drawing Sheets

PROCESS FOR THE POLYMERIZATION OF ETHYLENE, AND ETHYLENE POLYMERS HAVING BROAD MOLECULAR WEIGHT DISTRIBUTION AND LONG-CHAIN BRANCHING

CROSS-REFERENCE TO RELATED APPLICATIONS

This application is the U.S. national phase of International Application PCT/EP2009/008513, filed Nov. 30, 2009, claiming priority to European Application 08020828.3 filed Dec. 1, 2008; the disclosures of International Application PCT/EP2009/008513 and European Application 08020828.3, each as filed, are incorporated herein by reference.

FIELD OF THE INVENTION

The present invention concerns a process for the polymerization of ethylene in the presence of a mixed catalyst, which is able to give new polyethylene products having broad molecular weight distribution (MWD) and long-chain branching.

BACKGROUND OF THE INVENTION

Polyethylenes having broad MWD are widely used in the art in various applications, such as fibers, moldings, films and pipes, in view of the improved properties that they exhibit over narrow molecular weight distribution polyethylenes. Such polyethylenes may be multimodal, i.e. may present molecular weight distribution curves having more than one molecular weight peak, due to the presence of a plurality of polymer fractions having different molecular weights. In view of their broad MWD, this kind of polyethylenes can also be processed more easily with respect to monomodal, narrow MWD polyethylenes.

Various methods are known in the art to produce polyethylenes with broad MWD, including post reactor melt blending, single stage processes carried out in the presence of a catalyst system comprising a mixture of different catalysts, and multistage processes. The method used determines the properties of the polyethylene, in that the properties of the obtained polyethylene depend not only on the properties of the single polymer fractions thereof, but also by the quality of the mixing of these fractions.

Various families of polymerization catalysts are known in the art, such as Ziegler catalysts, metallocene catalysts and the more recently developed transition metal complexes comprising ligands other than cyclopentadienyl. For instance, WO 98/27124 discloses 2,6-bis(imino)pyridyl complexes of iron and cobalt as catalysts for homo- or co-polymerization of ethylene. J. Am. Chem. Soc. 127, 13019-13029 (2005) describes the preparation of several bis-iminopyridinato Ziegler catalysts and their activities in the polymerization of ethylene.

Polyethylene having broad MWD may be produced in a single reactor by using catalyst systems comprising at least two different ethylene polymerization catalysts, able to produce polyethylene fractions having different molecular weight. For instance, WO 95/11264 discloses the use of a combination of catalyst compositions comprising at least two different ethylene polymerization catalysts of the Ziegler type or the metallocene type to produce a polyethylene having a broad molecular weight distribution.

WO 99/46302 describes a catalyst composition for the polymerization of alpha-olefins comprising a 2,6-bis(imino)pyridyl iron catalyst and another catalyst, such as a zirconocene or a Ziegler catalyst. These mixed catalyst systems are able to give, in a single polymerization step, polyethylene products having broad MWD and short-chain branches, like C2 and C4 branches, but the products normally do not show the presence of long-chain branching. In fact, the 2,6-bis(imino)pyridyl iron catalysts are known to produce linear polyethylene, as indicated for instance in WO 2007/111499, where the iron catalyst is used in combination with different catalysts components (like Ni, Cr and Pd catalysts), which are able to produce polyethylene with short branching, in order to prepare substantially linear polyethylene products.

In is known in the art that branched PE products may be obtained by the in situ polymerization of ethylene with combined iron catalyst and traditional Ziegler-Natta catalyst. The mixed catalyst system is commonly used in a tandem reaction, where higher 1-alkene is produced from ethylene oligomerization by one catalysts (normally the iron catalyst), and it is then copolymerized by the other catalyst (Ziegler-Natta catalyst) in situ with ethylene to produce linear low density polyethylene (LLDPE). Nevertheless, the obtained products mainly contain short branches, such as ethyl and butyl, and only minor amounts of higher branches (such as hexyl and longer than hexyl).

An approach investigated in the past to expand the branching level of polyethylene was to incorporate higher comonomers; nevertheless, this gives problem of different reactivity of the catalysts with respect to the different comonomers, thus requiring a high outlay in terms of apparatus; moreover, the obtained branches are still short.

Therefore, it is felt the need for a process able to provide, in acceptable yields, ethylene polymers having broad MWD and high amounts of long-chain branches.

SUMMARY OF THE INVENTION

It has surprisingly been found that, by polymerizing ethylene in the presence of a specific mixed catalyst system, it is possible to obtain new polyethylene products having a very advantageous and unique combination of broad molecular weight distribution and long-chain branching, above all at high molecular weight fractions.

More specifically, the invention concerns new homo or copolymers of ethylene with one or more higher alpha-olefins, having strain hardening equal or higher than 1.4 (measured by uniaxial elongation, at constant elongational rate of $0.5\ s^{-1}$, at 150° C.), branching index g' equal or lower than 0.9 (measured by GPC-MALLS, at a Mw of the polymer of $2 \cdot 10^6$ g/mol), and molecular weight distribution (Mw/Mn, measured by GPC with IR detection as indicated in the experimental section)>6, preferably ranging of from 6.5 to 100, more preferably of from 7 to 40.

The polyethylene polymer of the invention has a density ranging of from 0.935 $g/cm^3$ to 0.970 $g/cm^3$ and/or is produced by using a catalyst or catalyst system comprising at least a Ziegler catalyst, preferably it has a density of from 0.940 to 0.965 $g/cm^3$, most preferably of from 0.945 to 0.955 $g/cm^3$ and/or is produced by using a catalyst or catalyst system comprising at least a Ziegler catalyst The polymer has a branching index g' of 0.9 or less, preferably of 0.8 or less, more preferably of 0.7 or less. The parameter g' is measured at Mw of $2 \cdot 10^6$ g/mol for the purpose of such definition. It is a measure of the long chain branching frequency; an polymer devoid of long chain branching has a g' of close or equal to one. It is worth noting that the experimentally measurable branching factor g' is correlated with the theoretically derivable branching factor g defined by the theoretical considerations of Zimm and Stockmeyer (Zimm et al., J. Chem. Phys. 1949, 17, 1301-1314) as described in Graessley, W, Acc. Chem. Res. 1977, 332-339.

It is a further object of the present invention a process for the homo or copolymerization of ethylene, comprising polymerizing ethylene and optionally one or more higher alpha-olefins in the presence of a catalyst system preferably comprising:

- at least one polymerization catalyst (A) based on a late transition metal component comprising Fe and/or Co in a positive oxidation state (i.e. >0), and
- at least one Ziegler polymerization catalyst (B), wherein the catalyst has been annealed at a temperature >100° C., preferably at a temperature of from 110 to 140° C., preferably for a time of at least 10 minutes, more preferably for a time of from 1 to 20 hours. The process is preferably carried out in gas-phase, more preferably in a single reactor and/or wherein both catalysts (A), (B) are active.

The molar ratio of the metal of the Ziegler catalyst (B) to the late transition metal of the catalyst (A) is preferably in the range from 500:1 to 1:100, more preferably from 100:1 to 1:50, and even more preferably from 50:1 to 1:1.

Unless otherwise indicated, by "polymer" is meant homopolymer or copolymer, comprising two or more comonomers.

Unless otherwise indicated, by "polymerization" is meant homopolymerization or copolymerization.

Unless otherwise indicated, by "polyethylene" is meant an ethylene homopolymer or a copolymer of ethylene and at least a further comonomer.

By "ethylene homopolymer" is meant a polymer comprising repeating ethylene monomeric units, possible comonomers of different species being present in a limited amount, in any case such that the melting temperature $T_m$ of the polymer is about 125° C. or greater, wherein the melting temperature $T_m$ is the temperature at the maximum of the melting peak as better described in the following. $T_m$ is measured according to ISO 11357-3 by a first heating at a heating rate of 20° C./min until a temperature of 200° C. is reached, a dynamic crystallization at a cooling rate of 20° C./min until a temperature of −10° C. is reached, ad a second heating at a heating rate of 20° C./min until a temperature of 200° C. is reached. The melting temperature $T_m$ (maximum of the melting peak of the second heating) is therefore the temperature at which the curve of the enthalpy vs. temperature of the second heating has a maximum.

By "copolymer of ethylene" is meant a polymer comprising repeating ethylene monomeric units and at least one further comonomer of different species, having a melting temperature $T_m$ lower than 125° C.

Unless otherwise indicated, by "molecular weight", unless otherwise indicated, is meant the weight average molar weight $M_w$, measured as indicated below.

All percentages of single components mentioned in the present application, unless otherwise indicated, are based on weight, based on the total weight of the corresponding composition or mixtures comprising those components.

The late transition metal component (A) preferably is a multidentate transition metal complex. More preferably, the late transition metal catalyst (A) are complexes of formula (I):

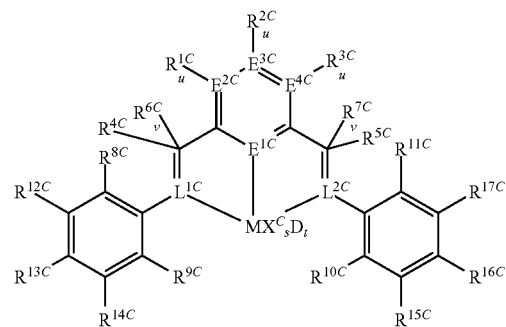

(I)

wherein:
M is Fe or Co, and preferably Fe,
$E^{1C}$ is nitrogen or phosphorus, preferably is nitrogen,
$E^{2C}$-$E^{4C}$ are each, independently of one another, carbon, nitrogen or phosphorus, preferably at least one of $E^{2C}$-$E^{4C}$ is carbon, preferably all are carbon
$R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}{}_2$, $OR^{18C}$, $SiR^{19C}{}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring and/or two vicinal radicals $R^{1C}$-$R^{3C}$ may be joined to form a five-, six- or seven-membered heterocycle comprising at least one atom selected from the group consisting of N, P, O and S, are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, $NR^{18C}{}_2$, $SiR^{19C}{}_3$, where the organic radicals $R^{4C}$-$R^{7C}$ may also be substituted by halogens and/or two geminal or vicinal radicals $R^{4C}$-$R^{7C}$ may also be joined to form a five-, six- or seven-membered ring and/or two geminal or vicinal radicals $R^{4C}$-$R^{7C}$ may be joined to form a five-, six- or seven-membered heterocycle comprising at least one atom selected from the group consisting of N, P, O and S and, when v is 0, $R^{6C}$ is a bond to $L^{1C}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{5C}$,
u is 0 when $E^{2C}$-$E^{4C}$ is nitrogen or phosphorus and is 1 when $E^{2C}$-$E^{4C}$ is carbon,
$L^{1C}$-$L^{2C}$ are each, independently of one another, nitrogen or phosphorus, in particular nitrogen,
$R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical or a halogen,
$R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}{}_2$, $OR^{18C}$, $SiR^{19C}{}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring and/or two vicinal radicals $R^{8C}$-$R^{17C}$ may be joined to form a five-, six- or seven-membered heterocycle comprising at least one atom selected from the group consisting of N, P, O and S, v is independently 0 or 1, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having from 1-10 carbon atoms in the alkyl radical and 6-20 carbon atoms in the aryl radical, $NR^{18C}{}_2$, $OR^{18C}$, $SR^{18C}$, $SO_3R^{18C}$, $OC(O)R^{18C}$, CN, SCN, β-diketonate, CO, $BF_4^-$, $PF_6^-$ or bulky noncoordinating anions and the radicals $X^C$ may optionally be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, $SiR^{19C}{}_3$, where the organic radicals $R^{18C}$ may also be substituted by halogens or nitrogen- and oxygen-comprising groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, where the organic radicals $R^{19C}$ may also be substituted by halogens or nitrogen- and oxygen-comprising groups and two radicals $R^{19C}$ may also be joined to form a five- or six-membered ring, s is 1, 2, 3 or 4, preferably 2 or 3, D is an uncharged donor and t is from 0 to 4, preferably 0, 1 or 2.

The three atoms $E^{2C}$ to $E^{4C}$ in a molecule can be identical or different. If $E^{4C}$ is phosphorus, then $E^{2C}$ to $E^{4C}$ are preferably carbon. If $E^{1C}$ is nitrogen, then $E^{2C}$ to $E^{4C}$ are preferably nitrogen or carbon, preferably carbon.

The substituents $R^{1C}$-$R^{3C}$ and $R^{12C}$-$R^{17C}$ can be varied within a wide range. Possible organic substituents $R^{1C}$-$R^{3C}$ and $R^{12C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where two radicals $R^{1C}$ to $R^{3C}$ and/or two vicinal radicals $R^{12C}$-$R^{17C}$ may optionally also be joined to form a 5-, 6- or 7-membered ring and/or two of the vicinal radicals $R^{1C}$-$R^{3C}$ and/or two of the vicinal radicals $R^{12C}$-$R^{17C}$ may be joined to form a five-, six- or seven-membered heterocycle comprising at least one atom selected from the group consisting of N, P, O and S and/or the organic radicals $R^{1C}$-$R^{3C}$ and/or $R^{12C}$-$R^{17C}$ may also be substituted by halogens such as fluorine, chlorine or bromine. Furthermore, $R^{1C}$-$R^{3C}$ and $R^{12C}$-$R^{17C}$ can be amino $NR^{18C}{}_2$ or $N(SiR^{19C}{}_3)_2$, alkoxy or aryloxy $OR^{18C}$, for example dimethylamino, N-pyrrolidinyl, picolinyl, methoxy, ethoxy or isopropoxy, or halogen such as fluorine, chlorine or bromine. In organosilicon substituents $SiR^{19C}{}_3$, possible radicals $R^{19C}$ are the same carboorganic radicals which have been mentioned in detail above for $R^{1C}$-$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}{}_3$ radicals can also be bound to $E^{2C}$-$E^{4C}$ via an oxygen or nitrogen, for example trimethylsilyloxy, triethylsilyloxy, butyldimethylsilyloxy, tributylsilyloxy or tri-tert-butylsilyloxy.

Preferred radicals $R^{1C}$-$R^{3C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or ortho-dichloro-substituted phenyls, trialkyl- or trichloro-substituted phenyls, naphthyl, biphenyl and anthranyl. Particularly useful organosilicon substituents are trialkylsilyl groups having from 1 to 10 carbon atoms in the alkyl radical, preferably trimethylsilyl groups.

Preferred radicals $R^{12C}$, $R^{14C}$, $R^{15C}$, $R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, preferably hydrogen. $R^{12C}$, $R^{14C}$, $R^{15C}$ and $R^{17C}$ are preferably hydrogen.

Preferred radicals $R^{13C}$ and $R^{16C}$ are hydrogen, $C_1$-$C_{22}$-alkyl or halogen; more preferably hydrogen, methyl or chlorine.

Preferred radicals $R^{9C}$ and $R^{10C}$ are halogen, in particular chlorine.

Preferred radicals $R^{9C}$ and $R^{11C}$ are methyl.

Preference is given to $R^{12C}$, $R^{14C}$, $R^{15C}$ and $R^{17C}$ being identical and $R^{13C}$ and $R^{16C}$ being identical. This also preferably applies to the preferred embodiments described above.

The substituents $R^{4C}$-$R^{7C}$ can also be varied within a wide range. Possible organic substituents $R^{4C}$-$R^{7C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where two radicals $R^{4C}$ to $R^{7C}$ may optionally also be joined to form a 5-, 6- or 7-membered ring and/or two geminal radicals $R^{4C}$-$R^{7C}$ may be joined to form a five-, six- or seven-membered heterocycle comprising at least one atom from the group consisting of N, P, O and S and/or the organic radicals $R^{4C}$-$R^{7C}$ may also be substituted by halogens such as fluorine, chlorine or bromine. Furthermore, $R^{4C}$-$R^{7C}$ may be amino, $NR^{18C}{}_2$ or $N(SiR^{19C}{}_3)_2$, for example dimethylamino, N-pyrrolidinyl or picolinyl. In organosilicon substituents $SiR^{19C}{}_3$, possible radicals $R^{19C}$ are the same carboorganic radicals which have been mentioned above for $R^{1C}$-$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}{}_3$ radicals may also be joined via nitrogen to the carbon bearing them. When v is 0, $R^{6C}$ is a bond to $L^{1C}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{5C}$.

Preferred radicals $R^{4C}$-$R^{7C}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or ortho-dichloro-substituted phenyls, trialkyl- or trichloro-substituted phenyls, naphthyl, biphenyl and anthranyl. Preference is also given to amide substituents $NR^{18C}_2$, in particular secondary amides such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl)amide, didecylamide, N-methyloctadecylamide, N-methylcyclohexylamide, N-ethylcyclohexylamide, N-isopropylcyclohexylamide, N-tert-butylcyclohexylamide, dicyclohexylamide, pyrrolidine, piperidine, hexamethylenimine, decahydroquinoline, diphenylamine, N-methylanilide or N-ethylanilide.

$L^{1C}$ and $L^{2C}$ are each, independently of one another, nitrogen or phosphorus, preferably nitrogen, and when v is 0 can form a double bond to the carbon atom bearing $R^{4C}$ or $R^{5C}$. When v is 0, $L^{1C}$ and/or $L^{2C}$ together with the carbon atom bearing $R^{4C}$ or $R^{5C}$ preferably form an imino group —$CR^{4C}$=N— or —$CR^{5C}$=N—. When v is 1, $L^{1C}$ and/or $L^{2C}$ together with the carbon atom bearing $R^{4C}$ or $R^{5C}$ preferably forms an amido group —$CR^{4C}R^{6C}$—$N^-$— or —$CR^{5C}R^{7C}$—$N^-$—.

The ligands $X^C$ are determined, for example, by the choice of the corresponding metal starting compounds which are used for the synthesis of the late transition metal complexes, but can also be varied subsequently. Preferred ligands $X^C$ are the halogens such as fluorine, chlorine, bromine or iodine and preferably chlorine. Alkyl radicals such as methyl, ethyl, propyl, butyl, vinyl, allyl, phenyl or benzyl can also be used as ligands $X^C$. Further ligands $X^C$ are, merely by way of example and not exhaustively, trifluoroacetate, $BF_4^-$, $PF_6^-$ and weakly coordinating or noncoordinating anions (see, for example, S. Strauss in Chem. Rev. 1993, 93, 927-942) such as $B(C_6F_5)_4^-$. Amides, alkoxides, sulfonates, carboxylates and β-diketonates are also particularly suitable ligands $X^C$. Some of these substituted ligands X are particularly preferably used since they can be obtained from cheap and readily available starting materials. Thus, a particularly preferred embodiment is obtained when $X^C$ is dimethylamide, methoxide, ethoxide, isopropoxide, phenoxide, naphthoxide, triflate, p-toluenesulfonate, acetate or acetylacetonate.

Variation of the radicals $R^{18C}$ enables, for example, physical properties such as solubility to be finely adjusted. Possible organic substituents $R^{18C}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{20}$-alkenyl which may be linear, cyclic or branched and in which the double bond can be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may bear further alkyl groups and/or N- or O-comprising radicals as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may bear further alkyl groups as substituents, e.g. benzyl, o-, m-, p-methylbenzyl, 1- or 2-ethylphenyl, where two radicals $R^{18C}$ may optionally also be joined to form a 5- or 6-membered ring and the organic $R^{18C}$ may also be substituted by halogens such as fluorine, chlorine or bromine. In organosilicon substituents $SiR^{19C}_3$, possible radicals $R^{19C}$ are the same radicals which have been mentioned above for $R^{18C}$, where two radicals $R^{19C}$ may optionally also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl and also vinyl, allyl, benzyl and phenyl as radicals $R^{18C}$.

The number s of the ligands $X^C$ depends on the oxidation state of the late transition metal. The number s can thus not be given in general terms. The oxidation state of the late transition metal complex in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to iron complexes in the oxidation state +3 or +2.

D is an uncharged donor, preferably an uncharged Lewis base or Lewis acid, for example an amine, alcohol, ether, ketone, aldehyde, ester, sulfide or phosphine, which can be bound to the late transition metal centre or else be comprised as residual solvent from the preparation of the late transition metal complexes.

The number t of the ligands D can be from 0 to 4 and is often dependent on the solvents in which the late transition metal complex is prepared and the time for which the resulting complexes are dried and can therefore also be a nonintegral number such as 0.5 or 1.5. t is preferably 0, 1 to 2.

Preferred embodiments are iron complexes of formula (IIa):

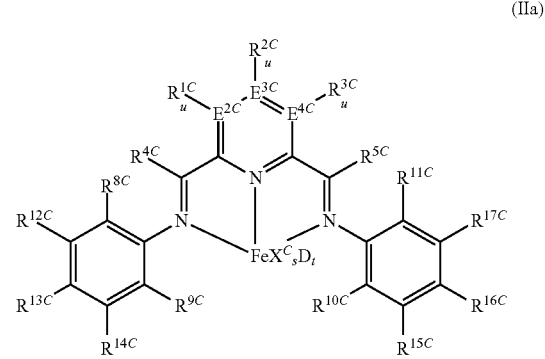

wherein:
$E^{2C}$-$E^{4C}$ are each, independently of one another, carbon, nitrogen or phosphorus, preferably with the condition that at least one of $E^{2C}$-$E^{4C}$ is carbon, more preferably all are carbon, $R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring and/or two vicinal radicals $R^{1C}$-$R^{3C}$ may be joined to form a five-, six- or seven-membered heterocycle comprising at least one atom selected from the group consisting of N, P, O and S, $R^{4C}$-$R^{5C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, $NR^{18C}_2$, $SiR^{19C}_3$, where the organic radicals $R^{4C}$-$R^{5C}$ may also be substituted by halogens, u is 0 when $E^{2C}$-$E^{4C}$ is nitrogen or phosphorus and is 1 when $E^{2C}$-$E^{4C}$ is carbon, $R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, i.e. F, Cl, Br, I, $R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{12C}$-$R^{17C}$ may also be joined to form a five-, six- or seven-membered ring and/or two vicinal radicals $R^{8C}$-$R^{17C}$ may be joined to form a five-, six- or seven-membered heterocycle comprising at least one atom selected from the group consisting of N, P, O and S, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl radical and 6-20 carbon atoms in the aryl radical, $NR^{18C}_2$, $OR^{18C}$, $SR^{18C}$, $SO_3R^{18C}$, $OC(O)R^{18C}$, CN, SCN, β-diketonate, CO, $BF_4^{31}$, $PF_6^-$ or bulky noncoordinating anions and the radicals $X^C$ may optionally be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, $SiR^{19C}_3$, where the organic radicals $R^{18C}$ may also bear halogens or nitrogen- and oxygen-comprising groups as substituents and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, where the organic radicals $R^{19C}$ may also bear halogens or nitrogen- and oxygen-comprising groups as substituents and two radicals $R^{19C}$ may also be joined to form a five- or six-membered ring, S is 1, 2, 3 or 4, preferably 2 or 3, D is an uncharged donor and t is from 0 to 4, preferably 0, 1 or 2.

The embodiments described above and the preferred embodiments likewise apply to $E^{2C}$-$E^{4C}$, $R^{1C}$-$R^{3C}$, $X^C$, $R_{18C}$ and $R^{19C}$.

The substituents $R^{4C}$-$R^{5C}$ can be varied within a wide range. Possible organic substituents $R^{4C}$-$R^{5C}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where the organic radicals $R^{4C}$-$R^{5C}$ may optionally also be substituted by halogens such as fluorine, chlorine or bromine. Furthermore, $R^{4C}$-$R^{5C}$ can be amino $NR^{18C}_2$ or $N(SiR^{19C}_3)_2$, for example dimethylamino, N-pyrrolidinyl or picolinyl. In organosilicon substituents $SiR^{19C}_3$, possible radicals $R^{19C}$ are the same organic radicals as have been mentioned above for $R^{1C}$-$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals can also be bound via nitrogen to the carbon bearing them.

Preferred radicals $R^{4C}$-$R^{5C}$ are hydrogen, methyl, ethyl, n-propyl, isopropyl, n-butyl, isobutyl, tert-butyl, n-pentyl, n-hexyl, n-heptyl, n-octyl or benzyl, preferably methyl.

The substituents $R^{12C}$-$R^{17C}$ can be varied within a wide range. Possible organic substituents $R^{12C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond can be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where two radicals $R^{12C}$ to $R^{17C}$ may optionally also be joined to form a 5-, 6- or 7-membered ring and/or two vicinal radicals $R^{12C}$-$R^{17C}$ may be joined to form a five-, six- or seven-membered heterocycle comprising at least one atom from the group consisting of N, P, O and S and/or the organic radicals $R^{12C}$-$R^{17C}$ may also be substituted by halogens such as fluorine, chlorine or bromine. Furthermore, $R^{12C}$-$R^{17C}$ can be halogen such as fluorine, chlorine, bromine, amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy. In organosilicon substituents $SiR^{19C}_3$, possible radicals $R^{19C}$ are the same carboorganic radicals as mentioned above for $R^{1C}$-$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals may also be bound via oxygen or nitrogen, for example trimethylsilyloxy, triethylsilyloxy, butyldimethylsilyloxy, tributylsilyloxy or tri-tert-butylsilyloxy.

Preferred radicals $R^{12C}$, $R^{14C}$, $R^{15C}$, $R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, preferably hydrogen. The Radicals $R^{12C}$, $R^{14C}$, $R^{15C}$ and $R^{17C}$ are preferably hydrogen.

Preferred radicals $R^{13C}$ and $R^{16C}$ are hydrogen, methyl and chlorine.

Preferred radicals $R^{9C}$ and $R^{11C}$ are halogen, in particular chlorine.

Preferred radicals $R^{8C}$ and $R^{10C}$ are methyl.

Preference is given to $R^{12C}$, $R^{14C}$, $R^{15C}$ and $R^{17C}$ being identical and $R^{13C}$ and $R^{16C}$ being identical. This preferably also applies to the preferred embodiments described above.

The preparation of the compounds (A) is described, for example, in J. Am. Chem. Soc. 120, p. 4049 ff. (1998), J. Chem. Soc., Chem. Commun. 1998, 849 and WO 98/27124. Preferred complexes (A) are 2,6-diacetylpyridinebis(2,6-dimethylphenylimine)iron dichloride, 2,6-diacetylpyridinebis(2,4,6-trimethylphenylimine)iron dichloride, 2,6-diacetylpyridinebis(2-chloro-6-methylphenylimine)iron dichloride, 2,6-diacetylpyridinebis(2,6-diisopropylphenylimine)iron dichloride, 2,6-diacetylpyridinebis(2,6-dichlorophenylimine)iron dichloride, 2,6-pyridinedicarboxaldehydebis(2,6-diisopropylphenylimine)iron dichloride, diacetylpyridinebis(2,6-dichlorophenylimine)iron dichloride, diacetylpyridinebis(2,6-difluorophenylimine)iron dichloride, diacetylpyridinebis(2,6-dibromophenylimine) iron dichloride or the respective dibromides or tribromides.

Another class of suitable late transition metal catalyst (A) are complexes of formula (IIb):

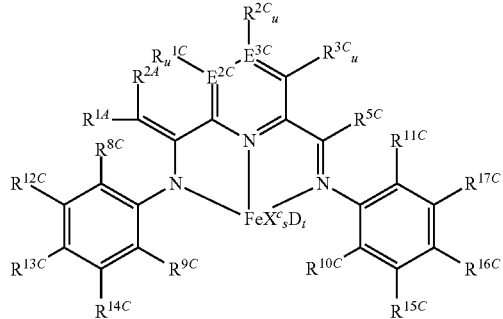

(IIb)

wherein:
$R^{1A}$-$R^{2A}$ independently of one another are hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{19C}_3$, wherein the organic radicals $R^{1A}$-$R^{2A}$ can also be substituted by halogens, and/or two radicals $R^{1A}$-$R^{2A}$ can also be bonded with one another to form a five- or six-membered ring, and the other variables have the meaning reported above for formula (IIa). More preferably, both $R^{1A}$, $R^{2A}$ are not hydrogen.

Another class of suitable late transition metal catalyst (A) are complexes of formula (IIc):

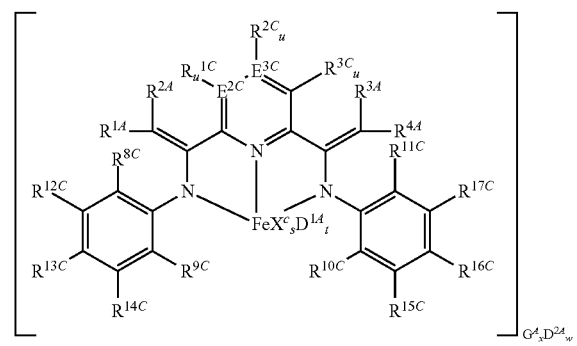

(IIc)

wherein:
$R^{3A}$-$R^{4A}$ independently of one another are hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{19C}_3$, wherein the organic radicals $R^{3A}$-$R^{4A}$ can also be substituted by halogens, and/or in each case two radicals $R^{3A}$-$R^{4A}$ can also be bonded with one another to form a five- or six-membered ring, $G^A$ is a simply positively charged cation,
$D^{1A}$, $D^{2A}$ are a neutral donor,
w are 0 to 4,
x is 0, 1 or 2,
z is 0, −1 or −2,
and the other variables have the meaning reported above for formulae (IIa) and (IIb). More preferably, both $R^{3A}$, $R^{4A}$ are not hydrogen.

In an embodiment of the invention, the late transition metal catalyst (A) is not a metallocene or half-sandwich metallocene.

The late transition metal catalyst (A) may be suitably activated by a cocatalyst, and preferably by one or more aluminoxanes. As aluminoxanes, it is possible to use, for example, the compounds described in WO 00/31090. Particularly suitable aluminoxanes are open-chain or cyclic aluminoxane compounds of the general formula (IV) or (V):

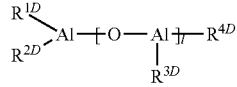

(IV)

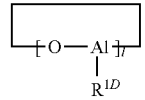

(V)

where $R^{1D}$-$R^{4D}$ are each, independently of one another, a $C_1$-$C_6$-alkyl group, preferably a methyl, ethyl, butyl or isobutyl group, and l is an integer from 1 to 40, preferably from 4 to 25.

A particularly suitable aluminoxane compound is methylaluminoxane.

These oligomeric aluminoxane compounds are usually prepared by controlled reaction of a solution of trialkylaluminum, preferably trimethylaluminum, with water. In general, the oligomeric aluminoxane compounds obtained in this way are present as mixtures of both linear and cyclic chain molecules of various lengths, so that l is to be regarded as an average. The aluminoxane compounds can also be present in admixture with other metal alkyls, usually with aluminum alkyls.

Furthermore, modified aluminoxanes in which some of the hydrocarbon radicals have been replaced by hydrogen atoms or alkoxy, aryloxy, siloxy or amide radicals can also be used in place of the aluminoxane compounds of the general formula (IV) or (V).

A further type of suitable cocatalyst for the late transition metal catalyst (A) is hydroxyaluminoxanes. These can be prepared, for example, by addition of from 0.5 to 1.2 equivalents of water, preferably from 0.8 to 1.2 equivalents of water, per equivalent of aluminum of an alkylaluminum compound, particularly preferably triisobutylaluminum, at low temperatures, usually below 0° C. Such compounds and their use in olefin polymerization are described, for example, in WO 00/24787. The atomic ratio of aluminum from the hydroxyaluminoxane compound to the late transition metal of catalyst (A) is usually in the range from 1:1 to 100:1, preferably from 10:1 to 50:1 and particularly preferably in the range from 20:1 to 40:1.

The Ziegler catalysts (B) comprise a solid component comprising a compound of titanium or vanadium, a compound of magnesium and optionally but preferably a particulate inorganic oxide as support; the Ziegler catalysts used in the process of the invention are obtained by annealing the catalyst, formed by said compounds of titanium or vanadium and magnesium and optionally said support, at a temperature >100° C., and preferably for at least 10 minutes; more preferably, the Ziegler catalyst is annealed at a temperature of from 110 to 140° C., and preferably for a period of from 1 to 20 hours. The annealing process comprises heating the catalyst and maintaining it at the indicated temperature, for the indicated time. The annealing temperature is preferably reached gradually, by heating the catalyst at a heating rate comprised between 1 and 10° C./min. The catalyst is maintained at the annealing temperature, preferably under stirring in solution; thereafter, the annealed catalyst may be cooled, preferably gradually, to room temperature.

Ziegler catalysts are well known in the art and are described for example in ZIEGLER CATALYSTS 363-386 (G. Fink, R. Mülhaupt and H. H. Brintzinger, eds., Springer-Verlag 1995). For the purposes of the present application, the expression Ziegler catalyst also includes the catalysts referred to as Ziegler-Natta catalysts in the literature.

As titanium compounds, use is generally made of the halides or alkoxides of trivalent or tetravalent titanium, with titanium alkoxy halogen compounds or mixtures of various titanium compounds also being possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)Cl_3$, $Ti(OC_2H_5)Br_3$, $Ti(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$ or $Ti(O\text{-}n\text{-}C_4H_9)_4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides, and in particular chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine, and in particular chlorine.

Possible halogen-comprising magnesium compounds are in particular magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides, $SiCl_4$ or $CCl_4$ and preferably chlorine or hydrogen chloride.

Examples of suitable halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the di($C_1$-$C_{10}$-alkyl) magnesium compounds.

Particular preference is given to using Ziegler catalysts which are commercially available, e.g. from Grace.

The molar ratio of the metal of the Ziegler catalyst (B) to the late transition metal of catalyst (A) to is preferably in the range from 500:1 to 1:100, more preferably from 100:1 to 1:50, and even more preferably from 80:1 to 1:1.

The mixed catalysts may also contain one or more activating compounds, in particular Lewis acids, able to react with late transition metal catalyst (A) and with the Ziegler catalyst (B) to convert them into catalytically active or more active compounds.

The Lewis acids are preferably strong Lewis acid compounds of the general formula (III)

$$M^{2D}X^{1D}X^{2D}X^{3D} \qquad (III)$$

wherein $M^{2D}$ is an element of group 13 of the Periodic Table of the Elements, preferably B, Al or Ga, and more preferably B, $X^{1D}$, $X^{2D}$ and $X^{3D}$ are each, independently of one another, hydrogen, $C_1$-$C_{10}$-alkyl, $C_6$-$C_{15}$-aryl, alkylaryl, arylalkyl, haloalkyl or haloaryl having from 1 to 10 carbon atoms in the alkyl radical and from 6 to 20 carbon atoms in the aryl radical, or fluorine, chlorine, bromine or iodine, preferably a haloaryl, and more preferably pentafluorophenyl.

Further examples of strong Lewis acids are mentioned in WO 00/31090.

Suitable aluminum activating compounds are trialkylaluminum and compounds derived therefrom, in which an alkyl group has been replaced by an alkoxy group or by a halogen atom, for example by chlorine or bromine. The alkyl groups can be identical or different. Both linear and branched alkyl groups are possible.

Preference is given to trialkylaluminum compounds wherein the alkyl groups have from 1 to 8 carbon atoms, such as trimethylaluminum, triethylaluminum, triisobutylaluminum, trioctylaluminum, methyldiethylaluminum and mixtures thereof. According to a preferred embodiment, the activating compound is selected from the group consisting of trimethylaluminum (TMA), triethylaluminum (TEA), triisobutylaluminum (TIBA) and mixtures thereof.

Suitable activating compounds also include boranes and boroxins, e.g. trialkylborane, triarylborane or trimethylboroxin. Particular preference is given to boranes bearing at least two perfluorinated aryl radicals. Particular preference is given to compounds of formula (III) wherein $X^{1D}$, $X^{2D}$ and $X^{3D}$ are identical, such as triphenylborane, tris(4-fluorophenyl)borane, tris(3,5-difluorophenyl)borane, tris(4-fluoromethylphenyl)borane, tris(pentafluorophenyl)borane, tris (tolyl)borane, tris(3,5-dimethylphenyl)borane, tris(3,5-difluorophenyl)borane or tris(3,4,5 trifluorophenyl)borane. Tris(pentafluorophenyl)borane is preferably used.

The activating compounds may be prepared by reaction of aluminum or boron compounds of the formula (III) with water, alcohols, phenol derivatives, thiophenol derivatives or aniline derivatives, with the halogenated and especially the perfluorinated alcohols and phenols being of particular importance. Examples of particularly suitable compounds are pentafluorophenol, 1,1-bis(pentafluorophenyl)methanol and 4-hydroxy-2,2',3,3',4,4',5,5',6,6'-nonafluorobiphenyl. Examples of combinations of compounds of the formula (III) with Brönsted acids are first and foremost trimethylaluminum/pentafluorophenol, trimethylaluminum/1-bis(pentafluorophenyl) methanol, trimethylaluminum/4-hydroxy-2, 2',3,3',4,4',5,5',6,6'-nonafluorobiphenyl, triethylaluminum/ pentafluorophenol, triisobutylaluminum/pentafluorophenol and triethylaluminum/4,4'-dihydroxy-2,2',3,3',5,5',6,6'-octafluorobiphenyl hydrate.

In further suitable aluminum and boron compounds of the formula (III), $R^{1D}$ is an OH group, as in, for example, boronic acids and borinic acids, with preference being given to borinic acids having perfluorinated aryl radicals, for example $(C_6F_5)_2$ BOH.

Strong Lewis acids which are suitable as activating compounds also include the reaction products of a boric acid with two equivalents of an aluminum trialkyl or the reaction products of an aluminum trialkyl with two equivalents of an acidic fluorinated, preferably perfluorinated hydrocarbon compounds, such as pentafluorophenol or bis(pentafluorophenyl) borinic acid.

The molar ratio of the metal (preferably Al) in activating compound to the late transition metal (preferably Fe) of catalyst (A) preferably ranges from 20,000:1 to 1:1, more preferably 1,000:1 to 10:1.

The late transition metal complex (A), the Ziegler catalyst (B) and optionally one or more activating compounds are preferably used in a solvent, with preference being given to aromatic hydrocarbons having from 6 to 20 carbon atoms, in particular xylenes, toluene, pentane, hexane, heptane or mixtures of these.

The catalyst components (A) and (B) can be used either alone or together with further components, as catalyst system for olefin polymerization. Further optional components may be one or more organic or inorganic supports.

In particular, to enable the late transition metal complex (A) and the Ziegler component (B) to be used in the gas phase or in suspension in polymerization processes, it is often advantageous for the complexes to be used in the form of a solid, i.e. for them to be applied to a solid support. Furthermore, the supported complexes have a high productivity. The late transition metal catalyst (A) and/or the Ziegler catalysts (B) can therefore optionally be immobilized on an organic or inorganic support, and be used in supported form in the polymerization. This enables, for example, deposits in the reactor to be avoided and the polymer morphology to be controlled.

As support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers having polar functional groups, for example copolymers of ethene and acrylic esters, acrolein or vinyl acetate.

A preferred catalyst composition to be used in the process of the invention comprises one or more support components. It is possible for both the late transition metal catalyst (A) and the Ziegler catalyst (B) to be supported, or only one of the two components can be supported. In a preferred variant, both components (A) and (B) are supported. The two components (A) and (B) can have been applied to different supports or together to a joint support. The components (A) and (B) are preferably applied to a joint support in order to ensure relative spatial proximity of the various catalyst sites and thus achieve good mixing of the different polymers formed.

To produce the catalyst systems of the invention, one of the components (A) and one of the components (B), and optionally an activating compound, may be immobilized on a support by physisorption or by means of a chemical reaction, i.e. covalent bonding of the components, with reactive groups of the support surface.

The order in which support component, late transition metal complex (A), Ziegler catalyst (B) and optionally the activating compound are combined is in principle immaterial. After the individual process steps, the various intermediates can be washed with suitable inert solvents, e.g. aliphatic or aromatic hydrocarbons.

The late transition metal complex (A), the Ziegler catalyst (B) and optionally the activating compound can be immobilized independently of one another, e.g. in succession or simultaneously. Thus, the support component can firstly be brought into contact with the activating compound, or the support component can firstly be brought into contact with the Ziegler catalyst (B) and/or the late transition metal complex (A). Preactivation of the Ziegler catalyst (B) with one or more activating compounds before mixing with the support is also possible. The late transition metal component can, for example, be reacted simultaneously with the transition metal complex with the activating compound, or can be preactivated separately by means of this. The preactivated late transition metal complex (A) can be applied to the support before or after the preactivated Ziegler catalyst (B). In one possible embodiment, the late transition metal complex (A) and/or the Ziegler catalyst (B) can also be prepared in the presence of the support material. A further method of immobilization is prepolymerization of the catalyst system with or without prior application to a support.

The immobilization is generally carried out in an inert solvent which can be filtered off or evaporated after the immobilization. After the individual process steps, the solid can be washed with suitable inert solvents, e.g. aliphatic or aromatic hydrocarbons, and dried. The use of the still moist, supported catalyst is also possible.

In a preferred form of the preparation of the supported catalyst system, at least one late transition metal complex (A) is brought into contact with an activating compound and subsequently mixed with the dehydrated or passivated support material. The Ziegler catalyst (B) is likewise brought into contact with at least one activating compound in a suitable solvent, preferably giving a soluble reaction product, an adduct or a mixture. The preparation obtained in this way is then mixed with the immobilized late transition metal complex, which is used either directly or after separating off the solvent, and the solvent is completely or partly removed. The resulting supported catalyst system is preferably dried to ensure that the solvent is removed completely or largely from the pores of the support material. The supported catalyst is preferably obtained as a free-flowing powder. Examples of the industrial implementation of the above process are described in WO 96/00243, WO 98/40419 or WO 00/05277. A further preferred embodiment comprises firstly applying the activating compound to the support component, and subsequently bringing this supported compound into contact with the late transition metal complex (A) and the Ziegler catalyst (B).

As support component, preference is given to using finely divided supports which can be any organic or inorganic solid. In particular, the support component can be a porous support such as talc, a sheet silicate such as montmorillonite or mica, an inorganic oxide or a finely divided polymer powder (e.g. polyolefin or polymer having polar functional groups). The inorganic oxide may be a refractory oxide.

The support materials used preferably have a specific surface area in the range from 10 to 1000 $m^2/g$, a pore volume in the range from 0.1 to 5 ml/g and a mean particle size of from 1 to 500 μm. Preference is given to supports having a specific surface area in the range from 50 to 700 $m^2/g$, a pore volume in the range from 0.4 to 3.5 ml/g and a mean particle size in the range from 5 to 350 μm. Particular preference is given to supports having a specific surface area in the range from 200 to 550 $m^2/g$, a pore volume in the range from 0.5 to 3.0 ml/g and a mean particle size of from 10 to 150 μm.

The inorganic support can be subjected to a thermal treatment, e.g. to remove adsorbed water. Such a drying treatment is generally carried out at temperatures in the range from 50 to 1000° C., preferably from 100 to 600° C., with drying at from 100 to 200° C. preferably being carried out under reduced pressure and/or under a blanket of inert gas (e.g. nitrogen), or the inorganic support can be calcined at temperatures of from 200 to 1000° C. to obtain, if appropriate, the desired structure of the solid and/or the desired OH concentration on the surface. The support can also be treated chemically using customary dessicants such as metal alkyls, preferably aluminum alkyls, chlorosilanes or $SiCl_4$ or else methylaluminoxane. Appropriate treatment methods are described, for example, in WO 00/31090.

The inorganic support material can also be chemically modified. For example, the treatment of silica gel with $NH_4SiF_6$ or other fluorinating agents leads to fluorination of the silica gel surface or the treatment of silica gels with silanes comprising nitrogen-, fluorine- or sulfur-comprising groups leads to correspondingly modified silica gel surfaces. The support material is preferably not an adduct of the formula $MgT_2 \cdot y\ AlR^v_j(OR^w)_{3-j}$, where Mg is magnesium, T is chlorine, bromine or iodine, Al is aluminum, $R^w$ is a linear or branched $C_1$-$C_{10}$-alkyl radical, y is in the range from 6.00 to 0.05, j is in the range from 3 to 0.1 and $R^v$ represents substituents which are identical or different and are hydrocarbon radicals having from 1 to 20 carbon atoms, e.g. linear or branched, cyclic or acyclic $C_1$-$C_{20}$-alkyls, $C_2$-$C_{20}$-alkenyls, $C_2$-$C_{20}$-alkynyls, $C_6$-$C_{20}$-aryls, $C_7$-$C_{20}$-alkylaryls or $C_7$-$C_{20}$-arylalkyl radicals, which may comprise silicon or germanium atoms.

Organic support materials such as finely divided polyolefin powders (e.g. polyethylene, polypropylene or polystyrene) can also be used and should preferably likewise be freed of adhering moisture, solvent residues or other impurities by means of appropriate purification and drying operations before use. It is also possible to use functionalized polymer supports, e.g. ones based on polystyrene, polyethylene, polypropylene or polybutylene, via whose functional groups, for example ammonium or hydroxyl groups, at least one of the catalyst components can be immobilized. Polymer blends can also be used.

Inorganic oxides suitable as support component may be found in groups 2, 3, 4, 5, 13, 14, 15 and 16 of the Periodic Table of the Elements. Examples of oxides preferred as supports comprise silicon dioxide, aluminum oxide and mixed oxides of the elements calcium, aluminum, silicon, magnesium or titanium and also corresponding oxide mixtures. Other inorganic oxides which can be used either alone or in combination with the abovementioned preferred oxidic supports are, for example, MgO, CaO, $AlPO_4$, $ZrO_2$, $TiO_2$, $B_2O_3$ or mixtures thereof.

Further preferred inorganic support materials are inorganic halides such as $MgCl_2$ or carbonates such as $Na_2CO_3$, $K_2CO_3$, $CaCO_3$, $MgCO_3$, sulfates such as $Na_2SO_4$, $Al_2(SO_4)_3$, $BaSO_4$, nitrates such as $KNO_3$, $Mg(NO_3)_2$ or $Al(NO_3)_3$.

Preference is given to using silica gels as solid support materials for catalysts for olefin polymerization since this material makes it possible to produce particles whose size and structure make them suitable as supports for olefin polymerization. Spray-dried silica gels, which are spherical agglomerates of smaller granular particles, viz. the primary particles, have been found to be particularly useful here. The silica gels can be dried and/or calcined before use.

Silica gels are generally used as finely divided powders having a mean particle diameter $D_{50}$ of from 5 to 200 μm, preferably from 10 to 150 μm, particularly preferably from 15 to 100 μm and more preferably from 20 to 70 μm, and usually have pore volumes of from 0.1 to 10 $cm^3/g$, preferably from 0.2 to 5 $cm^3/g$, and specific surface areas of from 30 to 1000 $m^2/g$, preferably from 50 to 800 $m^2/g$ and preferably from 100 to 600 $m^2/g$. The Ziegler catalyst (A) is preferably applied in such an amount that the concentration of the transition metal from the Ziegler catalyst (A) in the finished catalyst system is from 1 to 100 μmol, preferably from 5 to 80 μmol and particularly preferably from 10 to 60 μmol, per g of support.

The late transition metal catalyst (A) is preferably applied in such an amount that the concentration of the late transition metal from the late transition metal catalyst (A) in the finished catalyst system is from 1 to 200 μmol, preferably from 5 to 100 μmol and particularly preferably from 10 to 70 μmol, per g of support. The Ziegler catalyst (B) is preferably applied in such an amount that the concentration of transition metal from the Ziegler catalyst (B) in the finished catalyst system is from 1 to 200 μmol, preferably from 5 to 100 μmol and particularly preferably from 10 to 70 μmol, per g of support.

It is also possible for the catalyst system firstly to be prepolymerized with alpha-olefins, preferably linear $C_2$-$C_{10}$-1-alkenes and more preferably ethylene or propylene, and the resulting prepolymerized catalyst solid then to be used in the actual polymerization. The weight ratio of catalyst solid used in the prepolymerization to a monomer polymerized onto it is preferably in the range from 1:0.1 to 1:1000, preferably from 1:1 to 1:200. Furthermore, a small amount of an olefin, preferably an alpha-olefin, for example vinylcyclohexane, styrene or phenyldimethylvinylsilane, as modifying component, an antistatic or a suitable inert compound such as a wax or oil can be added as additive during or after the preparation of the catalyst system. The molar ratio of additives to the sum of late transition metal catalyst (A) and Ziegler catalyst (B) is usually from 1:1000 to 1000:1, preferably from 1:5 to 20:1.

The polymerization process of the invention can be carried out using any industrially known polymerization method.

The polymerization temperature is preferably in the range from −60 to 350° C., more preferably in the range from 20 to 300° C., and even more preferably from 25 to 150° C.

The polymerization pressure preferably is in the range of from 0.5 to 4000 bar, more preferably from 1 to 100 bar and, and even more preferably from 3 to 40 bar.

The polymerization can be carried out in batch or in continuous.

The polymerization can be carried out in bulk, in suspension, in the gas phase or in a supercritical medium, in conventional reactors for the polymerization of olefins.

High-pressure polymerization processes in tube reactors or autoclaves, solution processes, suspension processes, stirred gas-phase processes and gas-phase fluidized-bed processes can be conveniently used.

The mean residence times are preferably from 0.5 to 5 hours, more preferably from 1 to 4 hours. As known in the art, the suitable pressure and temperature values for carrying out the polymerization steps of the process of the invention will depend on the polymerization method.

In the case of high-pressure polymerization processes, which are preferably carried out at pressures of from 1000 to 4000 bar, in particular from 2000 to 3500 bar, high polymerization temperatures are preferably also set. Preferred temperature ranges for these high-pressure polymerization processes are from 200 to 320° C., more preferably from 220 to 290° C.

In the case of low-pressure polymerization processes, it is preferred to set a temperature which is at least a few degrees below the softening temperature of the polymer. In particular, temperatures of from 50 to 180° C., preferably from 70 to 120° C., are preferably set in these polymerization processes.

In the case of suspension polymerizations, the polymerization is preferably carried out in a suspension medium, preferably an inert hydrocarbon such as isobutane or mixtures of hydrocarbons or else in the monomers themselves. The polymerization temperature is preferably in the range from −20 to 115° C., and the pressure is preferably in the range from 1 to 100 bar. The solids content of the suspension is generally in the range from 10 to 80% wt.

Gas-phase polymerization steps are preferably carried out in the temperature range from 30 to 125° C., and preferably at a pressure of from 1 to 50 bar.

Among the above-mentioned alternative polymerization processes, particular preference is given to gas-phase polymerization, preferably carried out in gas-phase fluidized-bed reactors, to solution polymerization and to suspension polymerization, preferably in loop reactors and stirred tank reactors. The gas-phase polymerization can also be carried out in the condensed or supercondensed mode, in which part of the circulating gas is cooled to below the dew point and is recirculated as a two-phase mixture to the reactor.

According to a further alternative embodiment, it is possible to use a multizone reactor comprising two distinct polymerization zones connected to one another, by passing the polymer alternately through these two zones a predetermined number of times, as described in WO 97/04015.

The process of the invention is able to provide new homo or copolymers of ethylene with one or more higher alpha-olefins, having strain hardening equal or higher than 1.4 (measured by uniaxial elongation, at constant elongational rate of $0.5\ s^{-1}$, at 150° C.), branching index g' equal or lower than 0.9 (measured by GPC-MALLS, at the molecular weight Mw of $2 \cdot 10^6$ g/mol), and molecular weight distribution (Mw/Mn, measured GPC) raging from 6 to 100.

Strain hardening is equal or higher than 1.4, preferably equal or higher than 1.6, more preferably equal or higher than 1.8.

The branching index g' is equal or lower than 0.9 at the above defined Mw of the polymer, preferably lower than 0.85, more preferably comprised between 0.6 and 0.8.

The molecular weight distribution rages from 6 to 100, preferably ranges from 8 to 80, more preferably from 14 to 50.

The ethylene homo or copolymers of the invention has preferably a density ranging from 0.935 g/cm³ to 0.970 g/cm³, more preferably from 0.940 to 0.965 g/cm³.

Preferred higher alpha-olefins have from 3 to 12 carbon atoms, and more preferred are linear or branched $C_2$-$C_{12}$-1-alkenes, in particular linear $C_2$-$C_{10}$-1-alkenes such as propene, 1-butene, 1-pentene, 1-hexene, 1-heptene, 1-octene, 1-decene or branched $C_2$-$C_{10}$-1-alkenes such as 4-methyl-1-pentene.

The ethylene copolymer preferably comprises at least one higher alpha-olefin having from 4 to 8 carbon atoms, more preferably selected from the group consisting of 1-butene, 1-hexene and 1-octene.

One of the advantages of the process of the present invention is that it allows the obtainment of polyethylenes having broad MWD and long-chain branching. These properties strongly improve polyethylene processability.

The ethylene homo or copolymers produced with the process of the invention may be advantageously used for producing articles, in particular films, moldings and pipes. The ethylene homo or copolymers are in particular suitable for the production of blown film and cast films, since they possess good mechanical properties, high shock resistance and high tear strength combined with very good optical properties, in particular transparency and gloss.

Owing to their good mechanical properties, the ethylene homo or copolymers are likewise suitable for producing moldings, in particular blow molding products, and pipes.

EXAMPLES

The following analytical methods have been used to determine the properties reported in the description as well as in the examples:

Elongational Rheology Analysis

Strain hardening (also called elongational hardening or elongational strain hardening) was calculated from determined from measuring elongational melt viscosity during uniaxial elongation, at 150° at a constant elongational rate as indicated in the results section, typically and preferably with a rate of $0.5\ s^{-1}$, at 150°.

The measurements were performed on a parallel plate rheometer instrument Physica MCR 301 from AntonPaar, equipped with the Sentmanant Elongational Rheology tool (SER). The measurements were performed at 150° C., after an annealing time of 5 min at the measurement temperature. The measurements were repeated for different specimens of each sample at elongational rates varying between $0.01\ s^{-1}$ and $10\ s^{-1}$, typically at 0.01, 0.05, 0.1, 0.5, 1, 5, $10\ s^{-1}$. For each measurement, the uniaxial elongational melt viscosity was recorded as a function of time.

The test specimens were prepared for the measurement as follows: 2.2 g of the material were weighted and used to fill a moulding plate of 70×40×1 mm. The plate was placed in a press and heated up to 200° C., for 1 min, under a pressure of 25 bar. After the temperature of 200° C. was reached, the sample was pressed at 100 bar for 4 min. After the end of the compression-time, the material was cooled to room temperature and plates were removed from the form. From the 1 mm thick compressed polymer plate, rectangular films of 12×11 mm were cut off and measured in the rheometer.

Strain hardening in uniaxial elongation is the ratio of the maximum melt elongational viscosity measured at the specific elong. rate, $\eta_{E,max}$, over the linear response at the same time, $\eta_s$. The $\eta_{E,max}$, in case no plateau is observed after a certain elongation, can be defined as the maximum polymer melt viscosity value, under uniaxial elongation (with preferably a rate of 0.5 s$^{-1}$, as indicated with the data) at the temperature of 150° C., measured at 5-10 seconds after the start of deformation or at elongations L(t)/L(0)≥3.

The linear viscoelastic response, $\eta_s$, is calculated from fitting linear rheological data of G' and G" at the same temperature with a multi-mode Maxwell model, calculating the transient shear viscosity and multiplying by 3 (Trouton ratio).

The method is described in Mackosko C. W. Rheology Principles, Measurements and Applications, 1994, Wiley-VCH, New York. As known in the art, there is a direct correlation between strain hardening at uniaxial elongation and long-chain branching in PE.

GPC Analysis for Molecular Weight Determination

The determination of the molar mass distributions and the means Mn, Mw and Mw/Mn derived therefrom was carried out by high-temperature gel permeation chromatography using the method described in DIN 55672-1:1995-02 (February 1995), with the following deviations: solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB.

A WATERS Alliance 2000, equipped with the following pre-column SHODEX UT-G and separation columns SHODEX UT 806 M (3×) and SHODEX UT 807 connected in series, was used. The solvent was vacuum distilled under N$_2$ and was stabilized with 0.025% by weight of 2,6-di-tert-butyl-4-methylphenol. The flow rate used was 1 ml/min, the injection was 500 μl and polymer concentration was in the range of 0.01%-0.05% w/w. The molecular weight calibration was established by using monodisperse polystyrene (PS) standards from Polymer Laboratories (now Varian, Inc., Essex Road, Church Stretton, Shropshire, SY6 6AX,UK), in the range from 580 g/mol up to 11600000 g/mol and additionally Hexadecane. The calibration curve was then adapted to Polyethylene (PE) by means of the Universal Calibration method (Benoit H., Rempp P. and Grubisic Z., J. Polymer Sci., Phys. Ed., 5, 753 (1967)). The Mark-Houwink parameters used were for PS: $k_{ps}$=0.000121 dl/g, $\alpha_{ps}$=0.706 and for PE $k_{pe}$=0.000406 dl/g, $\alpha_{ps}$=0.725, valid in TCB at 135° C. Data recording, calibration and calculation was carried out using NTGPC_Control_V6.02.03 and NTGPC_V6.4.24 (hs GmbH, Hauptstraβe 36, D-55437 Ober-Hilbersheim) respectively.

GPC-MALLS Analysis for Determination of Branching Factor g'

The branching factor g', which allows to determine long-chain branches at high Mw, was measured by Gel Permeation Chromatography (GPC) coupled with Multi-Angle Laser-Light Scattering (MALLS), as described in the following.

The parameter g' is the ratio of the measured mean square radius of gyration to that of a linear polymer having the same molecular weight. Linear molecules show g' of 1, while values less than 1 indicate the presence of LCB. Values of g' as a function of molecular weight, M, were calculated from the equation:

$$g'(M)=<R_g^2>_{sample,M}/<R_g^2>_{linear\ ref.,M}$$

where $<R_g^2>_M$ is the mean-square radius of gyration for the fraction of molecular weight M. As linear references a NBS 1475 PE standard and high-density broad MWD polyethylene samples from Lyondellbasell were taken.

A Polymer Laboratories 210 high temperature GPC was used. As solvent 1,2,4-trichlorobenzene at 135° C. and a flow rate of 0.6 mL min$^{-1}$ employing three Shodex UT 806 and one UT 807 columns. Polyethylene (PE) solutions with concentrations of 1 to 5 mg/10 mL, depending on samples, were prepared at 150° C. for 2-4 h before being transferred to the SEC injection vials sitting in a carousel heated at 135° C. The polymer concentration was determined with infrared detection by a PolymerChar IR4 and the light scattering was measured with a Wyatt Dawn EOS multi angle MALLS detector (Wyatt Technology, Santa Barbara, Calif.). A laser source of 120 mW of wavelength 658 nm was used. The specific index of refraction was taken as 0.104 ml/g. Data evaluation was done with Wyatt ASTRA 4.7.3 and CORONA 1.4 software. The absolute molecular weights M and radius of gyration $<R_g^2>$ where established by Debye type extrapolation at each elution volume according to the described software. The ratio g'(M) was then calculated from the radius of gyration of the sample and the appropriate radius of the linear reference at the same molecular weight.

IR Analysis

The density [g/cm$^3$] was determined with IR in accordance with ASTM D 6248-98.

The vinyl double bond content, i.e. the content of vinyl groups/1000 carbon atoms, was determined by means of IR in accordance with ASTM D 6248-98.

The comonomer content was determined by means of IR in accordance with ASTM D 6248-98.

Miscellaneous Methods:

The amount of Al, Fe, Mg and Ti in the catalyst was measured by ICP-OES method, according to DIN EN ISO 11885.

Surface area were determined according to the B.E.T. method (apparatus used SORPTOMATIC 1900 by Carlo Erba).

Porosity was determined with the Hg method: the measure was carried out using a "Porosimeter 2000 series" by Carlo Erba. The porosity was determined by absorption of Hg under pressure. For this determination use was made of a calibrated dilatometer (diameter 3 mm) CD3 (Carlo Erba) connected to a reservoir of mercury and to a high-vacuum pump (1·10$^{-2}$ mbar). A weighed amount of sample was placed in the dilatometer. The apparatus was then placed under high vacuum (<0.1 mm Hg) and was maintained in these conditions for 20 minutes. The dilatometer was then connected to the mercury reservoir and mercury was allowed to flow slowly into it until it reached the level marked on the dilatometer at a height of 10 cm. The valve connecting the dilatometer to the vacuum pump was closed and mercury pressure was gradually increased with nitrogen up to 140 kg/cm$^2$. Under the effect of pressure, mercury enters the pores and the level goes down according to the porosity of the material. Porosity (cm$^3$/g), both total and due to pores up to 1 μm, pore distribution curve, and average pore size were directly calculated from the integral pore distribution curve, which is a function of the volume reduction of mercury and of the applied pressure values (such data were provided and elaborated by the computer associated to the porosimeter, equipped with a "MILESTONE 200/2.04" software by C. Erba).

EXAMPLE 1

Figure 1:
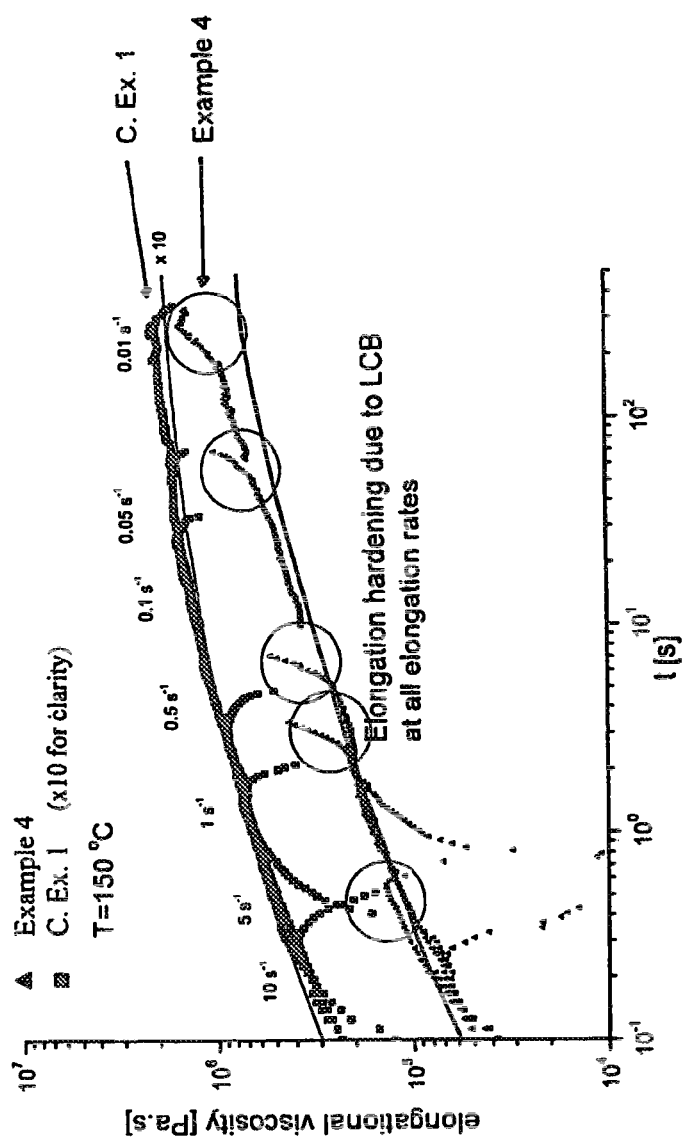
FIG. 1 reports a graph where elongational viscosity is plotted vs. elongational rate, showing the strain hardening behaviour of the ethylene polymer according to the present invention.

Preparation of 2,6-bis[1-(2-chloro-4,6-dimethylphenylimino)ethyl]pyridine iron(II) chloride a. Synthesis of 2,6-bis[1-(2-chloro-4,6-dimethylphenylimino)ethyl]pyridine ligand To a solution of 2,6-diacetylpyridine (35 g, 0.21 mol) in THF (1.21) was added 2-chloro-4,6-dimethylaniline (76.7 g, 2.3 eq) and Sicapent (45 g). The reaction mixture was refluxed overnight. Then additional 2-chloro-4,6-dimethylaniline (25 g, 0.7 eq) and Sicapent (25 g) were added and once again refluxed overnight. The suspension was cooled to 22° C., filtered and washed with two times THF (75 ml). The mother liquor was concentrated (90%) and methanol was added to precipitate the product, which was washed two times with methanol (50 ml) and dried under high vacuum. 68.8 g of a yellow powder was isolated (y=73.1%)

b. Conversion into 2,6-bis[1-(2-chloro-4,6-dimethylphenylimino)ethyl]pyridine iron(II) chloride complex To a solution of 2,6-bis[1-(2-chloro-4,6-dimethylphenylimino)ethyl]pyridine (150 g, 0.34 mol) in THF (31) was added by portions $FeCl_2 \cdot 4H_2O$ (64.6 g, 0.95 eq) at 22° C. The reaction mixture turned blue. After stirring 3 hours at 22° C., the blue suspension was filtered, washed three times with THF (300 ml) and dried under high vacuum. 174.0 g of a blue powder was isolated (y=90%), corresponding to the formula below:

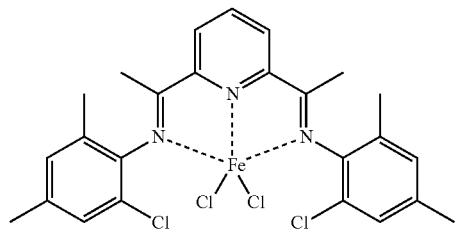

EXAMPLE 2

Preparation of the Ziegler Catalyst a) Preparation of the Intermediate Solid Component A magnesium chloride and alcohol adduct containing about 3 mols of alcohol was prepared following the method described in example 2 of U.S. Pat. No. 4,399,054, but working at 2000 RPM instead of 10000 RPM. The adduct were subject to a thermal treatment, under nitrogen stream, over a temperature range of 50-150° C. until a content of 25% wt. of alcohol was reached. Into a 2 L four-necked round flask, purged with nitrogen, 1 L of $TiCl_4$ was introduced at 0° C. Then, at the same temperature, 70 g of a spherical $MgCl_2$/EtOH adduct containing 25% wt of ethanol and prepared as described above were added under stirring. The temperature was raised to 140° C. in 2 h and maintained for 60 min. Then, the stirring was discontinued, the solid product was allowed to settle and the supernatant liquid was siphoned off. The solid residue was then washed once with heptane at 80° C. and five times with hexane at 25° C. and dried under vacuum at 30° C. and analyzed.

b) Annealing Treatment

Into a 250 $cm^3$ four-necked round flask, purged with nitrogen, 75 $cm^3$ of Isopar-L and 3.2 $cm^3$ of 20% wt/vol ethylaluminum dichloride (EADC)/hexane solution (5.04 mg atoms of Al) were introduced at 25° C.

The solution was stirred for 10 minutes and then, at the same temperature, 15 g of the intermediate solid component prepared as described in item (a), were added under stirring. The temperature was raised to 140° C. in 40 minutes and maintained for 5 hour. Then, the temperature was decreased to 80° C., the stirring was discontinued, the solid product was allowed to settle for 30 minutes and the supernatant liquid was siphoned off. The solid was washed three times with anhydrous hexane (100 $cm^3$) at 25° C. and finally, the solid was dried under vacuum and analyzed. The analytical results indicated that the catalyst contains 18.4 wt % Mg, 5.9 wt % Ti, 1.0 wt % Al, and 0.8 wt % EtOH, with a BET surface area of 30.4 $m^2$/g, a porosity (Hg method) PT of 0.924 $cm^3$/g and PF of 0.584 $cm^3$/g.

EXAMPLE 3

Preparation of a Mixed Catalyst System 229 g of the Ziegler catalyst prepared in Example 2 were loaded, under argon atmosphere, in a 2 L double neck round glass vessel equipped with a filter and a Teflon stirrer suitable to be used under vacuum, and then suspended in 605 mL toluene. 11.6 g EtOH (1 mol EtOH/mol Ti) were dropped at room temperature in the suspension and stirred for 30 minutes. The suspension was then filtered and washed with 605 mL toluene and filtered again. The solid was suspended in 605 mL toluene and cooled down to 0° C.

In parallel 4.52 g of 2,6-bis[1-(2-chloro-4,6-dimethylphenylimino)ethyl]pyridine iron(II) chloride, prepared in Example 1, were added to 243.5 mL MAO (30% wt in toluene) and stirred for 1 hour at room temperature. Afterwards the catalytic solution was cooled down at 0° C. and added within 60 minutes to the stirred catalyst suspension maintaining the temperature at 0° C.±2° C.

After the total addition, the suspension was stirred for 4 hour at room temperature. The solvent was filtered off and the solid was suspended again at room temperature in 605 mL toluene and stirred for 15 minutes and filtered off again. This operation was repeated using 605 mL heptane. The catalyst was finally dried for 2 hours at room temperature with high vacuum (0.03 mbar) to reach a free flowing powder with a percentage of 5-10% residual volatiles.

The dry catalyst was collected and analysed, giving the following results: 7.5% wt. Al, 0.13% wt. Fe, 14.4% wt. Mg, 5.7% wt. Ti and 49% wt. Cl. The molar ratio Al/Fe was 120.

EXAMPLE 4

Ethylene Polymerization

A stainless steel gas-phase, fluidized bed reactor, having an internal diameter of 200 mm, was used; the reactor was equipped with gas circulation system, cyclone, heat exchanger, temperature and pressure control systems, feeding lines for ethylene, propane, 1-hexene and hydrogen. All components were fed to the suction side of the fluidization compressor.

The reactor was purified by flushing with nitrogen at 120° C. for 12 hours. Then, the reactor was pressurized at 24 barg with propane and heated to 80° C.

Ethylene, 1-hexene, hydrogen and nitrogen were fed into the reactor, to reach a gas composition of 12.2 bar propane, 5.8 bar nitrogen, 4.8 bar ethylene, 0.9 bar hydrogen and 0.24 bar 1-hexene. The catalyst was introduced into the reactor at 2.6 g/h in a continuous way; antistatic ATMER and IPRA (tri-isopropyl aluminium) were fed to the reactor continuously, in amounts of 0.12 g/h and 0.8 g/h respectively. At the steady state, at the temperature of 80° C., polyethylene was discharged from the reactor in amount of 2.5 Kg/$g_{cat}$. The hold-up in the reactor was controlled to be about 15 kg, giving a residence time of 3 hours in the reactor.

The discharged polymer was finally dried by flushing with nitrogen. The properties of the obtained polymer are reported in Tables 1-2 below.

Comparative Example 1

A mixed catalyst system, containing a supported Ziegler-Natta catalyst component and a mixture of 2,6-bis[1-(2,4,6-trimethyl-phenylimino)ethyl]pyridine iron(II) chloride and MAO, was prepared as described in Example 32 of WO99/12981.

The catalyst system was further used in ethylene polymerization, as described in Example 4.

Performance Properties/Polymer Characterization Exp. 4 Vs. Comp. Exp. 1

The properties of the obtained polymer are reported in Tables 1-2 below.

TABLE 1

| Example | I.V. (dl/g) | $M_w \cdot 10^{-3}$ (g/mol) | $M_n \cdot 10^{-3}$ (g/mol) | $M_w/M_n$ | MFR (g/10 min) | Density (g/cm³) |
|---|---|---|---|---|---|---|
| Ex. 4 | 2.65 | 208.4 | 11.7 | 18 | 11 | 0.946 |
| Comp. Ex. 1 | 3.15 | 271.3 | 8.6 | 31 | 6.4 | 0.948 |

TABLE 2

| Example | Vinyl double bonds (1/1000C) | 1-Hexene (% wt) | Strain hardening (at constant elongational rate of 0.5 s⁻¹ & at 150° C.) | Branching index g' (at Mw of 2·10⁶ g/mol) |
|---|---|---|---|---|
| Ex. 4 | 0.8 | 2.1 | 1.9 | 0.6 |
| Comp. Ex. 1 | 1.5 | 1.3 | 1 | 0.85 |

The above results show that the process of the invention allows to obtain ethylene polymer with broad MWD and a higher amount of long-chain branching.

Figure 2:
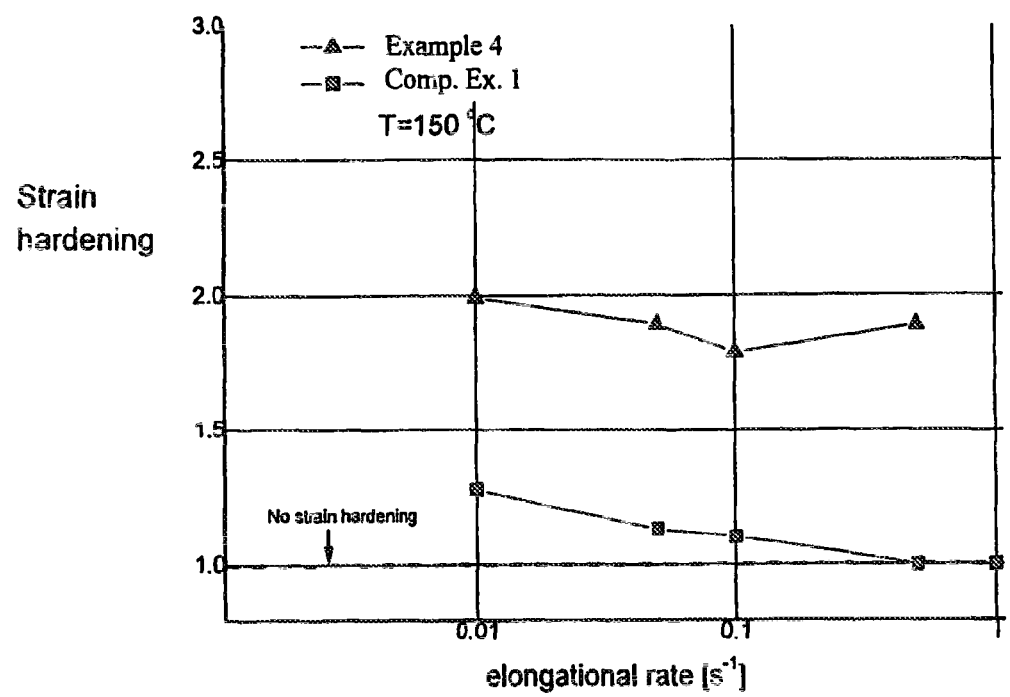
FIG. 2 shows a graph reporting strain hardening as a function of the applied elongational rate.

The presence of long-chain branching in the polyethylene of the invention (Ex. 4), as compared to the polyethylene obtained in Comp. Ex. 1, was proven by elongational rheology measurements, i.e. by the strain hardening value. As is well known in the art, long-chain branching results in elongational strain hardening, that is a rapid increase of elongational viscosity during extension. As evident from FIG. 1, Comp. Ex. 1 showed no strain hardening at any elongational rate, whilst the Example 4 according to the present invention, showed a pronounced elongational viscosity increase (that is strain hardening) at any applied deformation speeds, that is at all elongation rates in the range of from 5 s⁻¹ to 0.01 s⁻¹. The latter is typical for the polymers of the present invention, and is a generic feature of the polymers of the present invention. The fact of 'showing' elongational strain hardening is defined here as achieving at least a strain hardening value of 1.4 or above for a given elongational rate of equal to or <1 s⁻¹, as indicated in FIG. 2. The strain hardening measurable at 5 s⁻¹ is significant but of smaller extent.

FIG. 2 reports strain hardening as a function of the applied elongational rate, at a temperature of 150° C., for the polyethyelnes of Ex. 4 and Comp. Example 1. Strain hardening is calculated from the ratio of maximum or plateau point of measured elongational viscosity to the predicted value of steady-state viscosity (solid line in FIG. 1), as described above in details.

While the invention has been illustrated and described in detail in the drawings and foregoing description, the same is to be considered as illustrative and not restrictive in character, it being understood that only the selected embodiments have been shown and described and that all changes, equivalents, and modifications defined by following claims are desired to be protected.

The invention claimed is:

1. A homo- or copolymer of ethylene with at least one $C_3$ to $C_{12}$ olefin comonomer, having a strain hardening of 1.4 to 1.9 (measured by uniaxial elongation, at 150° C.) at a constant elongational rate of 0.5 s⁻¹, a branching index g' of at most 0.9 (measured at Mw of 2·10⁶ g/mole), and a molecular weight distribution Mw/Mn>6, and which is produced by using at least a Ziegler polymerisation catalyst.

2. The homo- or copolymer of ethylene according to claim 1, having a density of from 0.935 g/cm³ to 0.970 g/cm³.

3. The homo- or copolymer of ethylene according to claim 1, having a strain hardening of at least 1.6 (measured by uniaxial elongation, at constant elongational rate of 0.5 s⁻¹, at 150° C.).

4. The homo- or copolymer of ethylene according to claim 1, having a branching index g' of from 0.6 to 0.8.

5. The homo- or copolymer of ethylene according to claim 1, having a molecular weight distribution of from 8 to 80.

6. The homo- or copolymer of ethylene according to claim 1, wherein said comonomer is a $C_4$ to $C_8$-alpha-olefin.

7. The homo- or copolymer of ethylene according to claim 1, further having a strain hardening continuously of at least 1.4, (measured by uniaxial elongation at 150° C.) at a constant elongational rate in the range of from 0.01 s⁻¹ to 0.5 s⁻¹.

8. The homo- or copolymer of ethylene of claim 7, further having a strain hardening of 1.9 (measured by uniaxial elongation at 150° C.) at a constant elongational rate of 0.5 s⁻¹.

9. A process for producing the polymer of claim 1, comprising the step of polymerizing ethylene, optionally in the presence of $C_3$ to $C_{12}$ olefin comonomer, in the further presence of a catalyst system comprising
   i. optionally, at least one polymerization catalyst (A) based on a late transition metal component comprising at least one of Fe and Co having an oxidation state >0, ii. at least one Ziegler polymerization catalyst (B), wherein the at least one Ziegler catalyst was annealed at a temperature >100° C. when preparing the catalyst.

10. The process according to claim 9, wherein the at least one Ziegler catalyst (b) was annealed at a temperature of from 110 and 140° C. for a period of time from 1 to 20 hours.

11. The process according to claim 9, carried out in gas-phase in a single reactor.

12. The process according to claim 9, wherein the molar ratio of the metal of the at least one Ziegler catalyst (B) to the late transition metal of the catalyst (A) is in the range from 500:1 to 1:100.

13. The process according to claim 9, wherein the catalyst system further comprises at least one Lewis acid activating compound.

14. The process according to claim 9, wherein the late transition metal catalyst (A) is not a metallocene or half-sandwich metallocene.

15. The process according to claim 9, wherein the polymerization is carried out in a single reactor and with catalyst (A) and catalyst (B) being concomitantly active.

16. The process according to claim 9, wherein the Ziegler catalyst (B) comprises a compound of titanium or vanadium and a compound of magnesium, supported on a particulate inorganic oxide.

17. The process according to claim 9, wherein the catalyst system is supported on at least one inorganic oxide or halide.

18. A finished article comprising the homo or copolymer of the ethylene according to claim 1.

19. A homo- or copolymer of ethylene with at least one $C_3$ to $C_{12}$ olefin, having a strain hardening of 1.4 to 1.9 (measured by uniaxial elongation, at 150° C.) at a constant elongational rate of $0.5\ s^{-1}$, a branching index g' no higher than 0.9 (measured at Mw of $2 \cdot 10^6$ g/mole), a molecular weight distribution Mw/Mn>6, and a density of from 0.940 to 0.965 $g/cm^3$.

20. The homo- or copolymer of ethylene according to claim 1 wherein the $C_3$ to $C_{12}$-alpha-olefin is selected from the group consisting of propene, 1-butene, 1-pentene, 1-hexene, 1-heptene, 1-octene, and 1-decene.

21. The homo- or copolymer of ethylene according to claim 7 wherein the strain hardening is at least 1.6.

22. The process according to claim 17 wherein the inorganic oxide is a refractory oxide.

23. A polymer blend comprising the homo or copolymer of ethylene according to claim 1.

* * * * *